United States Patent [19]

Class

[11] Patent Number: 4,521,493
[45] Date of Patent: Jun. 4, 1985

[54] FIBER FILTER AND STABILIZER FORMULATION

[75] Inventor: Jay B. Class, Wilmington, Del.

[73] Assignee: Hercules Incorporated, Wilmington, Del.

[21] Appl. No.: 570,115

[22] Filed: Jan. 12, 1984

[51] Int. Cl.$^3$ .......................... C08G 93/00; C09J 5/00; A24C 5/50; C08L 93/04

[52] U.S. Cl. .................................. 428/498; 131/340; 131/343; 428/511; 428/514; 524/270; 524/271; 524/274; 524/499; 524/524; 525/179; 525/221; 525/222; 525/308

[58] Field of Search ............... 524/270, 271, 274, 499, 524/524; 428/498, 511, 514; 525/179, 221, 222, 308

[56] References Cited

U.S. PATENT DOCUMENTS

| | | | |
|---|---|---|---|
| 3,038,478 | 6/1962 | Touey et al. | 131/208 |
| 3,220,904 | 11/1965 | Touey et al. | 156/167 |
| 3,423,342 | 1/1969 | Kendall | 524/271 |
| 3,630,980 | 12/1971 | Russell | 524/271 |
| 3,644,251 | 2/1972 | Wilhelmi | 260/26 |
| 3,865,770 | 2/1975 | Blake | 260/27 |
| 3,970,623 | 7/1976 | Feeney et al. | 260/27 |
| 4,018,732 | 4/1977 | Lakshmanan et al. | 524/270 |
| 4,173,504 | 11/1979 | Tomioka et al. | 156/180 |
| 4,221,226 | 9/1980 | Kiefer et al. | 131/267 |
| 4,243,500 | 1/1981 | Glennon | 524/272 |
| 4,248,748 | 2/1981 | McGrath et al. | 524/271 |
| 4,276,111 | 6/1981 | Karim et al. | 156/308.2 |
| 4,280,942 | 7/1981 | Green | 428/514 |
| 4,337,297 | 6/1982 | Karim et al. | 428/514 |
| 4,337,298 | 6/1982 | Karim et al. | 428/514 |
| 4,358,557 | 11/1982 | Boggs | 524/272 |
| 4,367,113 | 1/1983 | Karim et al. | 524/271 |
| 4,379,465 | 7/1980 | Coq | 131/332 |

FOREIGN PATENT DOCUMENTS 1514217 6/1978 United Kingdom .

*Primary Examiner*—Herbert S. Cockeram
*Attorney, Agent, or Firm*—John E. Crowe

[57] ABSTRACT

A resin-modified fiber filter formulation, fiber filter element, and method for improving dimensional stability, firmness and resiliency of a polyolefin fiber filter element comprised of crimped polyolefin fiber tow, by contacting filaments thereof with a formulation comprising a blend of resin and base polymer emulsions as precursors forming the active formulation "in situ", at a convenient station by removing water, the solid resin component of which must have a low molecular weight and approved softening temperature range to obtain the desired characteristics.

Typical resins are polyterpenes and hydrogenated rosin esters; typical base polymers are polyvinyl acetate and copolymers thereof with, e.g., ethylene or acrylates.

14 Claims, No Drawings

FIBER FILTER AND STABILIZER FORMULATION

The present invention relates to a resin modified polymeric formulation, a fiber filter element of polyolefin fiber tow and a method for improving and dimensionally stabilizing the fiber filter body by initially wetting filaments thereof with modified resin and polymeric latice components in the form of aqueous emulsions or dispersions which can form the desired formulation, "in situ", and achieve desired performance characteristics after removal of water from aqueous phases.

BACKGROUND

While a wide variety of fibrous materials have been tried as air filter media, particularly for removing particulate matter and condensed tars from cigarette smoke, the most frequently used have been cellulose derivatives such as crimped textile tow of cellulose acetate fiber or mixture of the types described, for instance, in U.S. Pat. Nos. 2,794,239 and 4,366,826.

While such material is generally not as efficient as some of the finer denier synthetic fibers or fiber mixtures such as polyolefins, there remain substantial cost and handling advantages. For example, cellulose acetate tow can be rapidly and continuously processed into cuttable (stable) filter rods using standard filter-making equipment without jamming of the open fiber tow. This is accomplished by applying non-volatile liquid organic plasticizers such as triacetin, diacetin or citric acid in place of conventional adhesives to restrict lateral and longitudinal movement of the fibers. For such purpose the plasticizer is conveniently sprayed onto an open moving tow of cellulose acetate as fine droplets which are absorbed into the fibers relatively slowly and form softened areas capable of bonding adjacent fibers. This random bonding of fibers throughout the tow produces a consistency which is found useful for cutting filter rods into suitable lengths or plugs.

The above advantages, however, are offset by certain limitations. For example, cellulose acetate fibers are inherently weak (1.0–1.2 g./denier) compared with many synthetic fibers. This, in turn, limits the amount of tension and crimp which can be applied to cellulose acetate fiber tow on a conventional filter rod make-up machine. By their nature, cellulose acetate filaments cannot be drawn to obtain a denier of less than about 1.5.

Highly drawable synthetic polyolefin fiber, such as polypropylene, on the other hand, can be easily drawn from 3.5 denier or higher to a denier of less than 1 denier with correspondingly increased filter efficiency.

Crimped polyolefin fibers such as polypropylene, in particular, possess strength and durability while retaining an acceptable level of pressure drop. Using such filaments, it is possible to meet the need for finer fiber tows having a suitable crimp and a high tensile strength.

Polyolefin fibers such as polypropylene, however, also have some serious disadvantages. These stem mainly from the fact that the above-described method of bonding an open or bloomed fiber tow of cellulose acetate by using non-volatile liquid organic plasticizers, will not work with polyolefins due to the relative insolubility of the fibers. Moreover, conventional adhesives fail to supply the necessary consistency or hardener effect as indicated above. To meet this problem, an additional heat fusion step has met with some success. Such added step, however, requires substantial changes in conventional filter-making operations and equipment, and is expensive. For example, a heavier plug wrap, tipping paper and more effective gluing system are required for sealing the wrapper around the fiber.

It is an object of the present invention to effectively improve the dimensional stability and resiliency of polyolefin fiber filter elements.

It is a further object to obtain a stabilizing formulation capable of wetting polyolefin fibers such as polypropylene without jamming the open towed fiber within conventional filter processing and cutting equipment.

A still further object is to obtain a polypropylene fiber tow air filter suitable, in crush resistant and drawing properties, for use as a cigarette filter.

THE INVENTION

The above objects are obtained, in accordance with the present invention whereby polyolefin fiber filter elements are lubricated, wetted and dimensionally stabilized with respect to crush resistance and drawing properties by applying to the corresponding open fiber tow an aqueous emulsion or dispersion of (A) at least one of a wholly or partly hydrogenated rosin ester component esterified with glycerine or pentaerythritol, or a polyterpene resin component; said components having a low molecular weight not exceeding about 2000 and a drop softening point of about 60° C.–95° C.; and (B) a hardener component comprising at least one of polyvinyl acetate, a copolymer of vinyl acetate/ethylene, or a heat cured acrylic copolymer with vinyl acetate or styrene; and thereafter removing water from the aqueous phases in an amount sufficient to obtain the desired composition, "in situ".

Because of the unique combination of wetting, lubricating, and adhesive properties required of fiber filter stabilizers, particularly when used to form a selective polyolefin fiber element such as cigarette filters, the point at which the emulsions are broken, as water is lost, becomes very important to the proper function of conventional filter fabrication machinery. It is necessary, in this regard, that the applied emulsions or dispersions be broken to assure the necessary dimensionally stablizing properties.

While the respective emulsions or dispersions, as above described, may vary in solids content percentagewise, the preferred amount of (A)-to-(B) components "in situ", can fall within the range of about 5–30:95–70 and preferably 5–10:95–90 weight percent solids for purposes of the present invention.

Typically the rosin ester modifier (i.e. "A" Component) for purposes of the present invention, is an emulsion of a hard resinous solid, the resin moiety preferably being about 45% to about 100% hydrogenated. Such modifier, generally includes, for instance, about 5–25 weight percent resin ester having an abietic acid concentration of up to about 5%, a drop softening point within the range of about 60° C.–95° C. and a molecular weight not exceeding a weight average molecular weight of 2000 and preferably between about 300–1000 as determined by size exclusion chromatographic techniques using a styragel column, compared to polystyrene standards. Such material can be obtained commercially in the solid form or, in some cases, as an aqueous dispersion.

Suitable (A) components include, for instance, Floral®* 85 or 105 (glycerine and pentaerythritol ester of highly hydrogenated rosin Av. MW 600–1000); Hercolyn D ® (hydrogenated rosin methyl ester); Piccolyte ® A 115 resin (polyterpene); Staybelite Ester* 10 (glycerine ester of hydrogenated rosin, Av. MW 600–1000); Pentalyn ® H (pentaerythritol ester of hydrogenated rosin, Av. MW 600–1000) and Piccotex ® resin (copolymers of α-methylstyrene and vinyltoluene).
*Trademark of Hercules Incorporated Suitable (B) components within the scope of the present invention are obtainable, for instance, by polymerization of a monomer such as vinyl acetate alone or in admixture with a comonomer such as ethylene. In addition, other suitable (B) components are obtained by polymerization of monomers such as acrylic acid, methacrylic acid, ethyl acrylate, butyl acrylate, methyl methacrylate etc, or mixtures thereof with comonomers such as styrene, ethylene, propylene, butadiene and the like. The latice is conveniently obtained from a polymerization mixture containing water, the appropriate monomers, a free-radical polymerization initiator such as potassium persulfate with up to 10% weight of anionic or nonionic emulsifying agents, and similar art-recognized additives, with heating to a temperature of about 45° C.–90° C. For general purposes, adjustment to a slightly basic pH is preferred for subsequent blending. Suitable copolymer latices of the above type are found, for instance, in British Pat. No. 1514217. Material of such type is obtainable commercially, for instance, as Vinac ® 881 (a homopolymer of vinyl acetate), Airflex ® 405 (a copolymer of vinyl acetate 90/ethylene 10), or as otherwise described and known in the art or in the above-cited British patent.
** product of Air Products and Chemicals, Inc.

The invention is further illustrated by the following Examples, in which parts and percentages are by weight unless otherwise specified.

EXAMPLE I

Continuous 3.5 denier polypropylene staple fiber is carded and the open tow crimped, pulled into a thin ribbon about 12–14 inches wide, and drawn without treatment through a garniture and conventional filter rod-making device to form a filter plug, which is paper wrapped and cut into 90 mm lengths. The resulting test filter elements are used as controls for testing and evaluation.

EXAMPLE II

Example I is repeated except that the polypropylene open staple fiber tow is sprayed with hardener (mixed aqueous dispersions of latex hardener and resin components) by passing through an applicator box prior to entering the garniture. For test purposes, different blends of resin dispersion (A component supra) and polymeric latex (B component) are prepared by simple mixing of the respective emulsions or dispersions in predetermined amounts (based on weight percent solids) and placed in a common reservoir from which it is pumped to the applicator. The blend is applied at a predetermined constant rate onto the open fiber tow ribbon moving at a constant speed, and is then drawn through a garniture and wrapped. The treated test plugs or filter elements are evaluated with respect to Add-On weight and hardness as measured on a standard Filtrona Hardness and Resilience Tester, Model HRT Filtrona Cigarette Components, Ltd., Middlesex, England, using the following equation $$\text{Hardness} = 100 - \frac{\pi D}{C}$$

in which C is defined as the original circumference of a cross section of the test filter element in millimeters, and D is defined as the deflection of the filter element in hundreths of millimeters (0.01 mm) after being subjected to a 300 g load for 15 seconds.

Add-On is based on total weight of a treated element (including the paper wrap) and is calculated as follows:

$$\text{Add-on \%} = \frac{(W_2 - W_1)}{(W_1)} \times 100$$

in which $W_2$ is defined as weight (gm) of hardened element and $W_1$ is the weight (gm) of the untreated element.

The hardness as above measured and "Add-On" due to hardener take up is evaluated and results reported in Table I infra.

TABLE I

| Samples No | Treatment | Blend (wt. %) | Mean Hardness (Av) | Add On % (Av) |
|---|---|---|---|---|
| 1–10 | Control | — | 90.4 | 0 |
| 11–15 | PVA Latex *1 | — | 91.6 | 4.6 |
| 16–20 | PVA Latex/ Foral 85 *2 | 90/10 | 91.7 | 1.8 |
| 21–30 | PVA Latex/ Foral 85 | 70/30 | 92.2 | 3.0 |
| 31–35 | PVA Latex/ Foral 105 *3 | 90/10 | 92.6 | 3.4 |
| 36–40 | PVA Latex/ Piccolyte A 115 *4 | 90/10 | 93.4 | 4.6 |
| 40–49 | Vinac 881 *5/ Foral 85 | 90/10 | 94.2 | 4.4 |
| 50–56 | Vinac 881/ Piccolyte A 115 | 90/10 | 94.3 | 4.2 |
| 57–61 | PVA Latex/ Piccolyte A 115 | 90/10 | 93.4 | 4.6 |
| 62–65 | Airflex 405 *6/ Foral 85 | 90/10 | 89.6 | 1.2 |

*1 PVA Latex - A polyvinyl acetate-type latex emulsion.
*2 Foral 85 - An aqueous dispersion of a glycerine ester of highly hydrogenated resin.
*3 Foral 105 - An aqueous dispersion of pentaerythritol ester of highly hydrogenated resin.
*4 Piccolyte A 115 - An aqueous dispersion of poly ( - pinene) resin.
*5 Vinac 881 - A vinylacetate homopolymer emulsion. (A product of Air Products and Chemicals, Inc.)
*6 Airflex 405 - A vinylacetate-ethylene copolymer emulsion. (A product of Air Products and Chemicals, Inc.)

What is claimed is:

1. A resin-modified polymeric composition of an aqueous emulsion or dispersion of
    (A) a component of at least one wholly or partly hydrogenated rosin ester esterified with glycerin or pentaerythritol, or a polyterpene resin component; said component having a molecular weight not exceeding about 2000 with a drop softening point of about 60° C.–95° C.; and
    (B) a hardener component comprising at least one of an acetate or acrylate homopolymer, copolymer or terpolymer;
the ratio of (A)-to-(B) components falling within the range of about 5–30:95–70 weight percent solids upon substantial removal of water therefrom.

2. The composition of claim 1 wherein the (B) component is a member selected from the group consisting of a polyvinyl acetate, vinyl acetate/ethylene copolymer, vinyl acetate/2-ethylhexyl acrylate, heat cured acrylic copolymer, and heat cured styrene/butyl acrylate copolymer.

3. The composition of claim 2, wherein the ratio of (A)-to-(B) component is about 5–10:95–90 weight percent solid.

4. The composition of claim 3 wherein the (B) component comprises vinyl acetate/ethylene copolymer.

5. The composition of claim 3 wherein the (B) component comprises vinyl acetate/2-ethylhexyl acrylate copolymer.

6. The composition of claim 3 wherein the (B) component comprises polyvinyl acetate.

7. The composition of claim 3 wherein the (B) component comprises heat cured acrylic copolymer.

8. The composition of claim 3 wherein the (B) component comprises heat cured styrene/butyl acrylate copolymer.

9. A dimensionally stable filter comprising a polyolefin fiber plug bonded at least in part by the composition of claim 1.

10. A dimensionally stable filter comprising a polyolefin fiber plug bonded at least in part by a composition of claim 2 and paper wrapped.

11. A dimensionally stable filter comprising a polyolefin fiber plug bonded at least in part by a composition of claim 3 and paper wrapped.

12. A dimensionally stable filter comprising a polyolefin fiber plug bonded at least in part by a composition of claim 4 and paper wrapped.

13. A dimensionally stable filter comprising a polyolefin fiber plug bonded at least in part by a composition of claim 5 and paper wrapped.

14. A dimensionally stable filter comprising a polyolefin fiber plug bonded at least in part by a composition of claim 6 and paper wrapped.

* * * * *